(12) United States Patent
Hwang et al.

(10) Patent No.: US 9,668,239 B2
(45) Date of Patent: May 30, 2017

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Jaeho Hwang, Seoul (KR); Byounggill Kim, Seoul (KR); Woochan Kim, Seoul (KR); Jaehyung Kim, Seoul (KR); Sungryong Hong, Seoul (KR); Chulkyu Mun, Seoul (KR); Jinyong Choi, Seoul (KR); Jongseob Baek, Seoul (KR); Kookyeon Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/758,923

(22) PCT Filed: May 15, 2014

(86) PCT No.: PCT/KR2014/004356
§ 371 (c)(1),
(2) Date: Jul. 1, 2015

(87) PCT Pub. No.: WO2014/185724
PCT Pub. Date: Nov. 20, 2014

(65) Prior Publication Data
US 2015/0358941 A1   Dec. 10, 2015

Related U.S. Application Data

(60) Provisional application No. 61/823,893, filed on May 15, 2013.

(51) Int. Cl.
*H04H 20/71* (2008.01)
*H04W 72/00* (2009.01)
(Continued)

(52) U.S. Cl.
CPC ......... *H04W 72/005* (2013.01); *H04L 5/0044* (2013.01); *H04N 21/236* (2013.01);
(Continued)

(58) Field of Classification Search
CPC .................................................. H04W 72/005
(Continued)

(56) References Cited

FOREIGN PATENT DOCUMENTS

| EP | 2 200 206 A2 | 6/2010 |
|---|---|---|
| EP | 2 234 296 A2 | 9/2010 |

(Continued)

OTHER PUBLICATIONS

DVB-TM, "T2 Baseline Description", Version 0.3.4, Mar. 1, 2008, pp. 1-101 (123 total pages), XP-17817950.

*Primary Examiner* — Shripal Khajuria
(74) *Attorney, Agent, or Firm* — Birch, Stewart, Kolasch & Birch, LLP

(57) ABSTRACT

The present invention provides a method for transmitting broadcast signal. The method for transmitting a broadcast signal according to the present invention comprises the steps of: demultiplexing at least one input stream into a plurality of DPs (Data Pipes) wherein the step of demultiplexing includes the steps of dividing the input stream into a plurality of DPs in which data of the plurality of DPs include one or more consecutive input packets, segmenting the data of the plurality of DPs into data units each having the same length as that of a payload of a BB frame, cyclic-shifting the input packets of the divided data, allocating the cyclic-shifted input packets to the payload of the BB frame, and
(Continued)

inserting a header before the payload of the BB frame; and processing and transmitting the data of the plurality of DPs per DP.

16 Claims, 20 Drawing Sheets

(51) Int. Cl.
*H04W 4/06* (2009.01)
*H04L 5/00* (2006.01)
*H04N 21/236* (2011.01)
*H04N 21/434* (2011.01)

(52) U.S. Cl.
CPC ............ *H04N 21/434* (2013.01); *H04W 4/06* (2013.01); *H04H 20/71* (2013.01); *H04L 5/0007* (2013.01)

(58) Field of Classification Search
USPC ........................................................ 370/312
See application file for complete search history.

(56) References Cited

FOREIGN PATENT DOCUMENTS

| | | |
|---|---|---|
| EP | 2 424 146 A1 | 2/2012 |
| EP | 2 555 510 A2 | 2/2013 |
| WO | WO 2011/048020 A1 | 4/2011 |
| WO | WO 2011/062433 A2 | 5/2011 |

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS REFERENCE TO RELATED APPLICATIONS

This application is the National Phase of PCT International Application No. PCT/KR2014/004356, filed on May 15, 2014, which claims priority under 35 U.S.C. 119(e) to U.S. Provisional Application No. 61/823,893, filed on May 15, 2013, all of which are hereby expressly incorporated by reference into the present application.

FIELD OF THE INVENTION

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DETAILED DESCRIPTION OF THE INVENTION

Technical Objects

Accordingly, the present invention is directed to an apparatus for transmitting broadcast signals and an apparatus for receiving broadcast signals for future broadcast services and methods for transmitting and receiving broadcast signals for future broadcast services.

Technical Solutions

In order to achieve the above-described object, the present invention provides a method for transmitting a broadcast signal. The method for transmitting a broadcast signal according to the present invention may correspond to a method for transmitting a broadcast signal including a step of demultiplexing at least one or more input streams into a plurality of DPs (Data Pipes), wherein the step of demultiplexing at least one or more input streams includes a step of dividing the input stream into a plurality of DPs in which data of the plurality of DPs include one or more consecutive input packets, a step of segmenting the data of the plurality of DPs into data units each having the same length as that of a payload of a BB frame, a step of cyclic-shifting the input packets of the divided data, a step of allocating the cyclic-shifted input packets to the payload of the BB frame, and a step of inserting a header before the payload of the BB frame; and a step of processing and transmitting the data of the plurality of DPs per DP.

Preferably, a method for transmitting a broadcast signal may be proposed, wherein the step of cyclic-shifting the input packets of the divided data includes a step of performing shifting so as to allocate, among the input packets of the segmented data, a first input packet being uncut to a beginning of the payload.

Preferably, a method for transmitting a broadcast signal may be proposed, wherein the step of cyclic-shifting the input packets of the divided data further includes a step of performing shifting so as to allocate, among the input packets of the shifted data, an input packet having its front portion cut out to the end of the payload.

Preferably, a method for transmitting a broadcast signal may be proposed, wherein the step of processing and transmitting the data of the plurality of DPs per DP includes a step of encoding data of the plurality of DPs per DP in accordance with a code rate, a step of mapping the encoded data of the DP so as to generate at least one signal frame, and a step of modulating data of the signal frame being generated by using an OFDM (Orthogonal Frequency Division Multiplexing) method and transmitting a broadcast signal including data of the modulated signal frame.

In another aspect, the present invention provides a method for receiving a broadcast signal. The method for receiving a broadcast signal according to the present invention may correspond to a method for receiving a broadcast signal including a step of receiving a broadcast signal and processing data of a plurality of DPs being included in the received broadcast signal; and a step of multiplexing the plurality of DPs to at least one or more output streams, wherein the step of multiplexing to at least one or more output streams includes a step of gaining a new packet pointer by parsing a header of data of a DP, wherein the data of the DP includes at least one or more consecutive packets, a step of cyclic-shifting packets of the data of the DP by using the new packet pointer, and a step of merging the cyclic-shifted data into a consecutive output stream.

Preferably, a method for receiving a broadcast signal may be proposed, wherein the step of cyclic-shifting packets of the data of the DP includes a step of relocating a packet fragment located at an end portion of the data of the DP having been shifted by a transmitting end back to a beginning of the data of the DP.

Preferably, a method for receiving a broadcast signal may be proposed, wherein the step of cyclic-shifting packets of the data of the DP further includes a step of shifting the data of the DP having its packet fragment relocated.

Preferably, a method for receiving a broadcast signal may be proposed, wherein the step of receiving a broadcast signal and processing data of a plurality of DPs being included in the received broadcast signal includes a step of receiving a broadcast signal and demodulating data of a signal frame included in the received broadcast signal by using an OFDM method, a step of parsing a signal frame by de-mapping data of the plurality of DPs, and a step of decoding the data of the plurality of DPs per DP in accordance with the code rate.

Preferably, a method for receiving a broadcast signal may be proposed, wherein the step of decoding the data of the plurality of DPs per DP in accordance with the code rate performs decoding by using data being included in a packet header of packets of the data of the DP.

In yet another aspect, the present invention provides an apparatus for transmitting a broadcast signal. The apparatus for transmitting a broadcast signal may correspond to a apparatus for transmitting a broadcast signal including an input formatting module configured to demultiplex at least one or more input streams into a plurality of DPs (Data Pipes), wherein the input formatting module includes a first block configured to divide the input stream into a plurality of DPs in which data of the plurality of DPs include one or more consecutive input packets, a second block configured to segment the data of the plurality of DPs into data units each having the same length as that of a payload of a BB frame, a third block configured to cyclic-shift the input packets of the divided data and to allocate the cyclic-shifted input packets to the payload of the BB frame, and a fourth block configured to insert a header before the payload of the BB frame; and a data processing module configured to process and transmit the data of the plurality of DPs per DP.

Preferably, an apparatus for transmitting a broadcast signal may be proposed, wherein the third block is configured to perform shifting so as to allocate, among the input packets of the segmented data, a first input packet being uncut to a beginning of the payload.

Preferably, an apparatus for transmitting a broadcast signal may be proposed, wherein the third block is configured to perform shifting so as to allocate, among the input packets of the shifted data, an input packet having its front portion cut out to the end of the payload.

Preferably, an apparatus for transmitting a broadcast signal may be proposed, wherein the data processing module includes an encoding block configured to encode data of the plurality of DPs per DP in accordance with a code rate, a frame building block configured to map the encoded data of the DP so as to generate at least one signal frame, and an OFDM block configured to modulate data of the signal frame being generated by using an OFDM (Orthogonal Frequency Division Multiplexing) method and to transmit a broadcast signal including data of the modulated signal frame.

In a further aspect, the present invention provides an apparatus for receiving a broadcast signal. The apparatus for receiving a broadcast signal according to the present invention may correspond to an apparatus for receiving a broadcast signal including a data processing module configured to receive a broadcast signal and to process data of a plurality of DPs being included in the received broadcast signal; and an output processor module configured to multiplex a plurality of DPs to at least one or more output streams, wherein the output processor module includes a first block configured to gain a new packet pointer by parsing a header of data of a DP, wherein the data of the DP includes at least one or more consecutive packets, a second block configured to cyclic-shift packets of the data of the DP by using the new packet pointer, and a third block configured to merge the cyclic-shifted data into a consecutive output stream.

Preferably, an apparatus for receiving a broadcast signal may be proposed, wherein the second block is configured to relocate a packet fragment located at an end portion of the data of the DP having been shifted by a transmitting end back to a beginning of the data of the DP.

Preferably, an apparatus for receiving a broadcast signal may be proposed, wherein the second block is configured to shift the data of the DP having its packet fragment relocated.

Preferably, an apparatus for receiving a broadcast signal may be proposed, wherein the data processing module includes an OFDM block configured to receive a broadcast signal and to demodulate data of a signal frame included in the received broadcast signal by using an OFDM method, a frame parser block configured to parse a signal frame by de-mapping data of the plurality of DPs, and a decoding block configured to decode the data of the plurality of DPs per DP in accordance with the code rate.

Preferably, an apparatus for receiving a broadcast signal may be proposed, wherein the decoding block performs decoding by using data being included in a packet header of packets of the data of the DP.

Effects of the Invention

The present invention may control quality of service (QoS) per service or per service component by processing data based on characteristics of service to provide a variety of broadcast services.

The present invention may ensure transmission flexibility by transmitting a variety of broadcast services through the same radio frequency (RF) signal bandwidth.

The present invention may increase data transmission efficiency and broadcast signal transmission/reception robustness using an multiple-input multiple-output (MIMO) system.

BEST MODE FOR CARRYING OUT THE PRESENT INVENTION

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
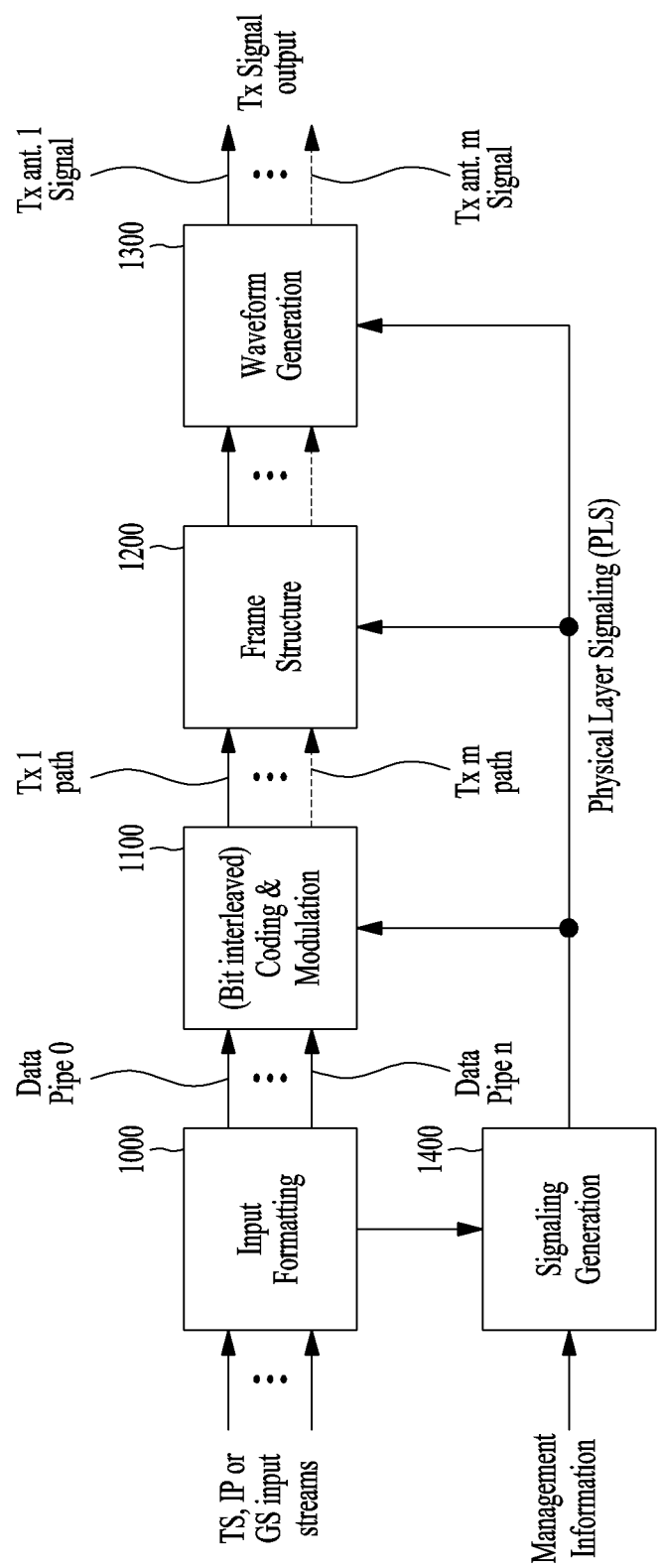
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
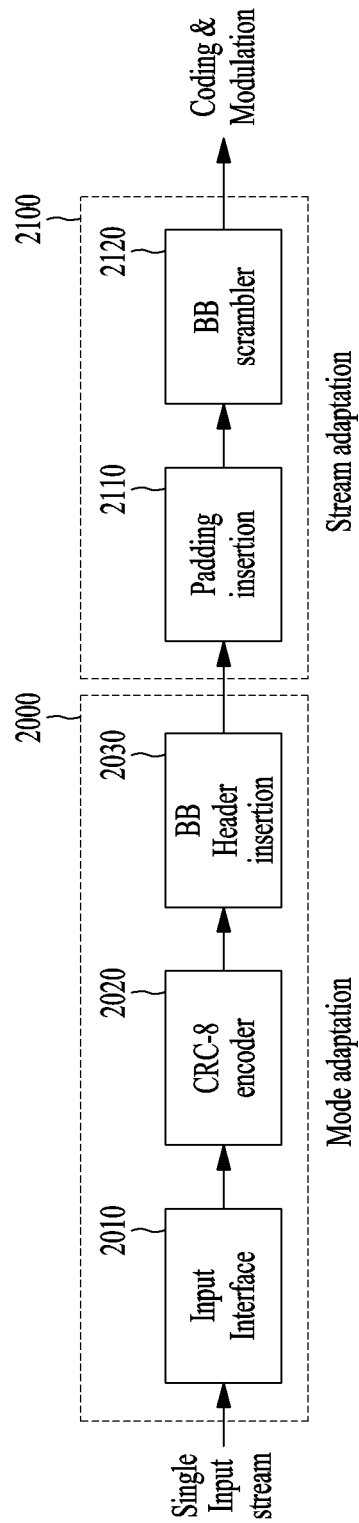
FIG. 2 illustrates an input formatting module according to an embodiment of the present invention.
Figure 3:
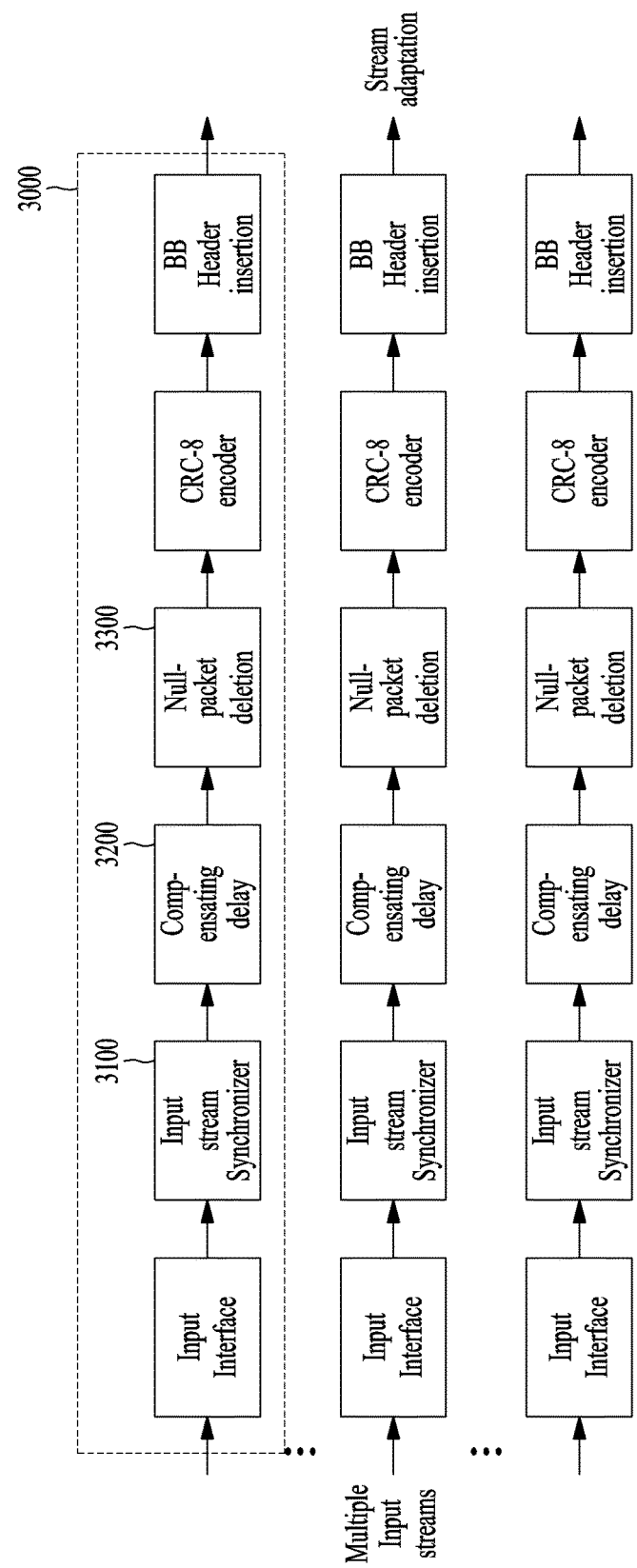
FIG. 3 illustrates an input formatting module according to another embodiment of the present invention.
Figure 4:
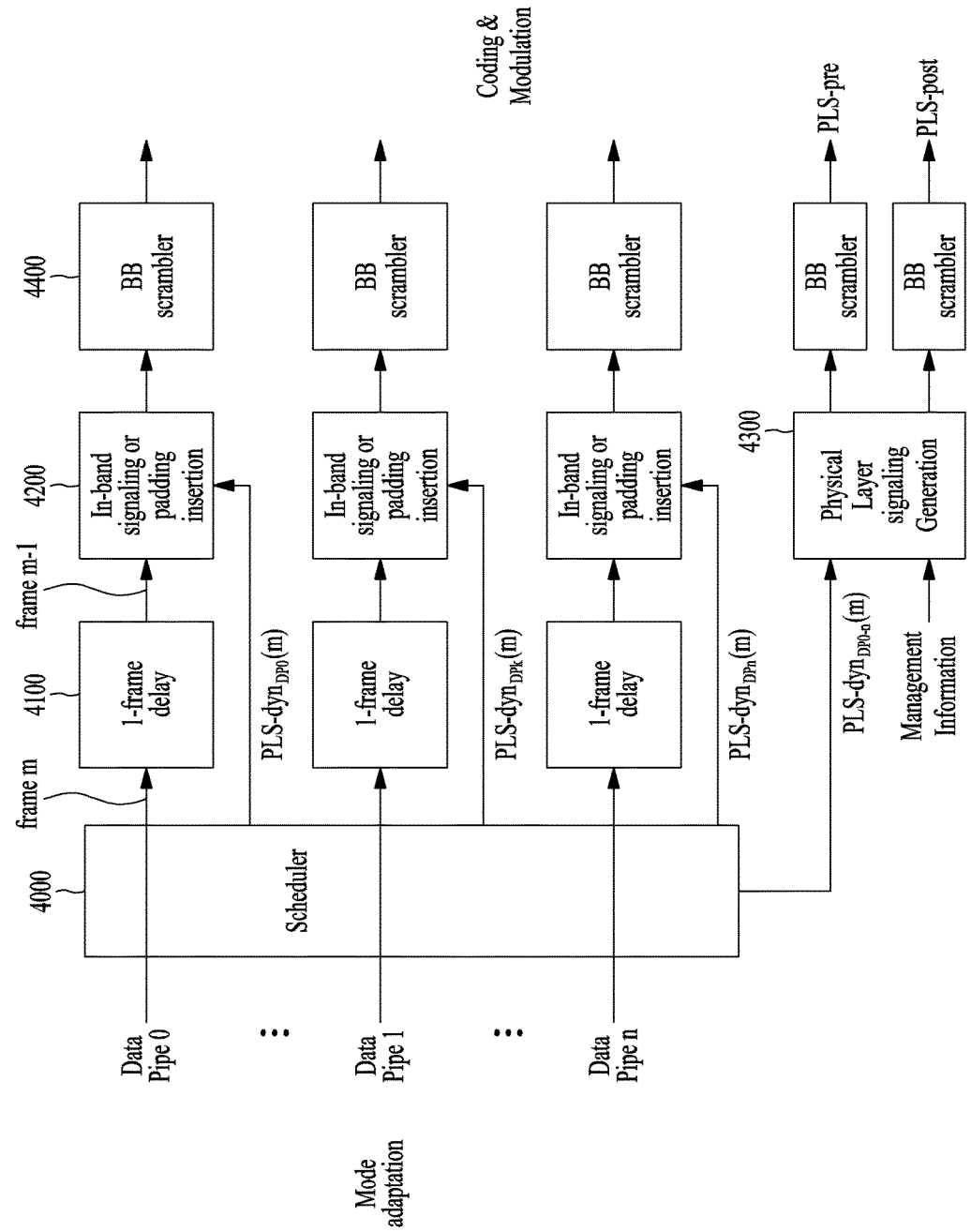
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
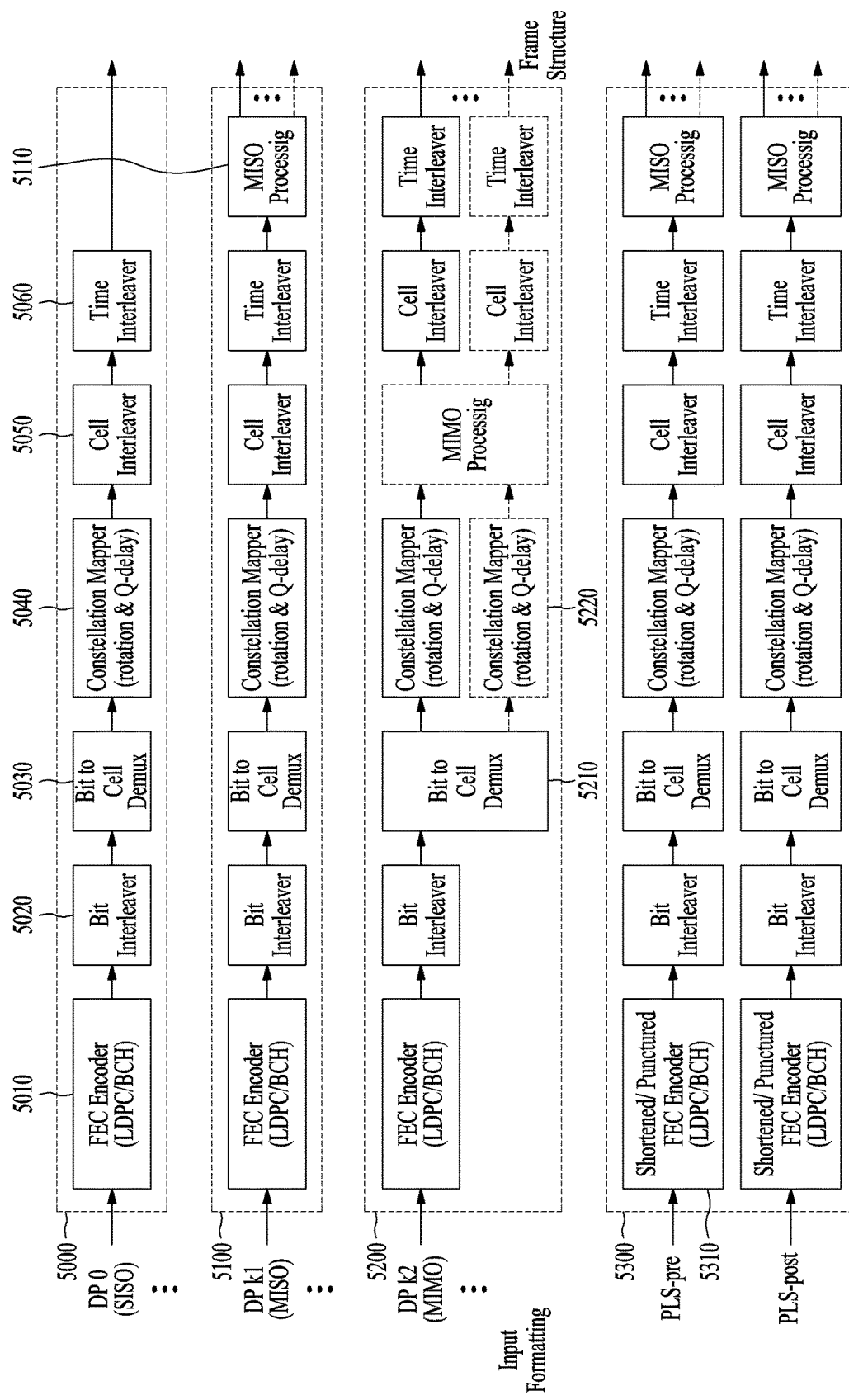
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
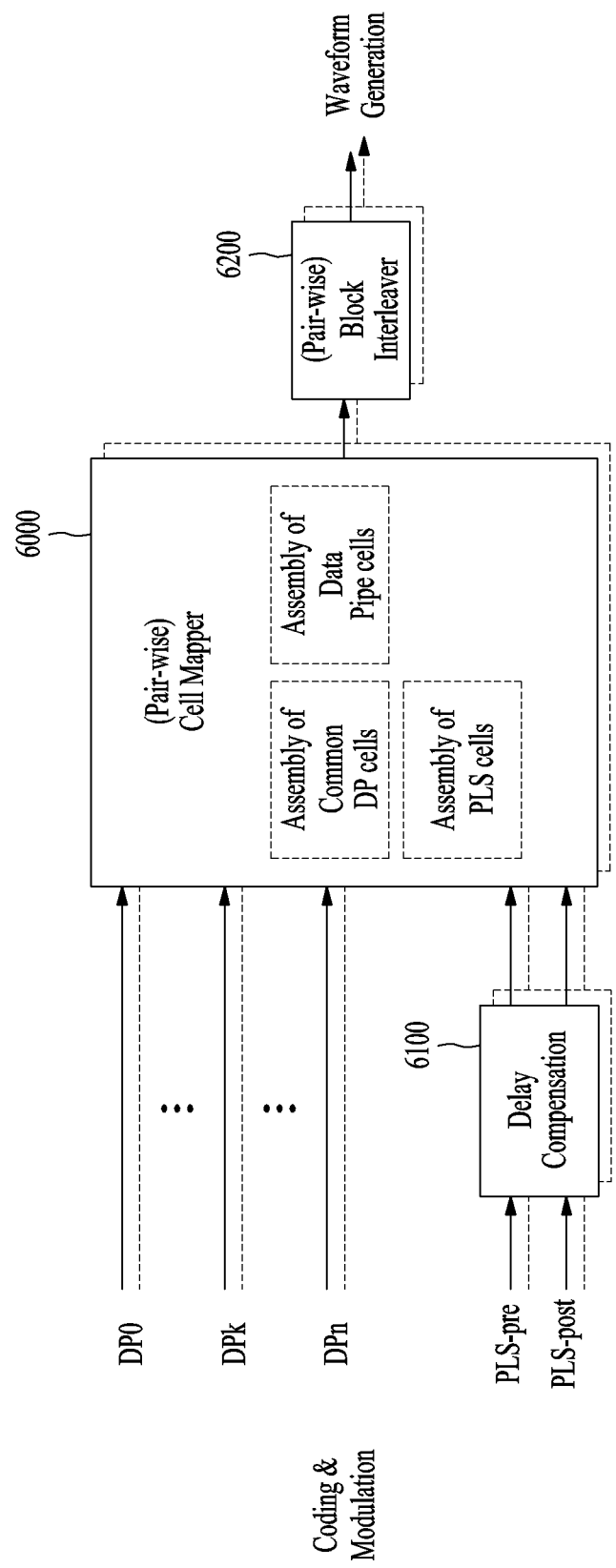
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

Figure 7:
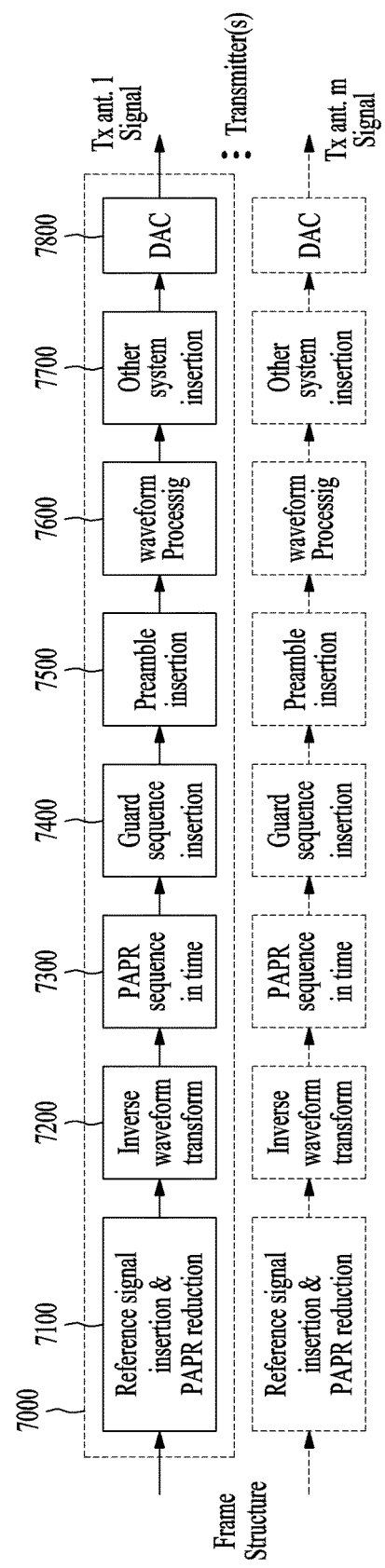
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
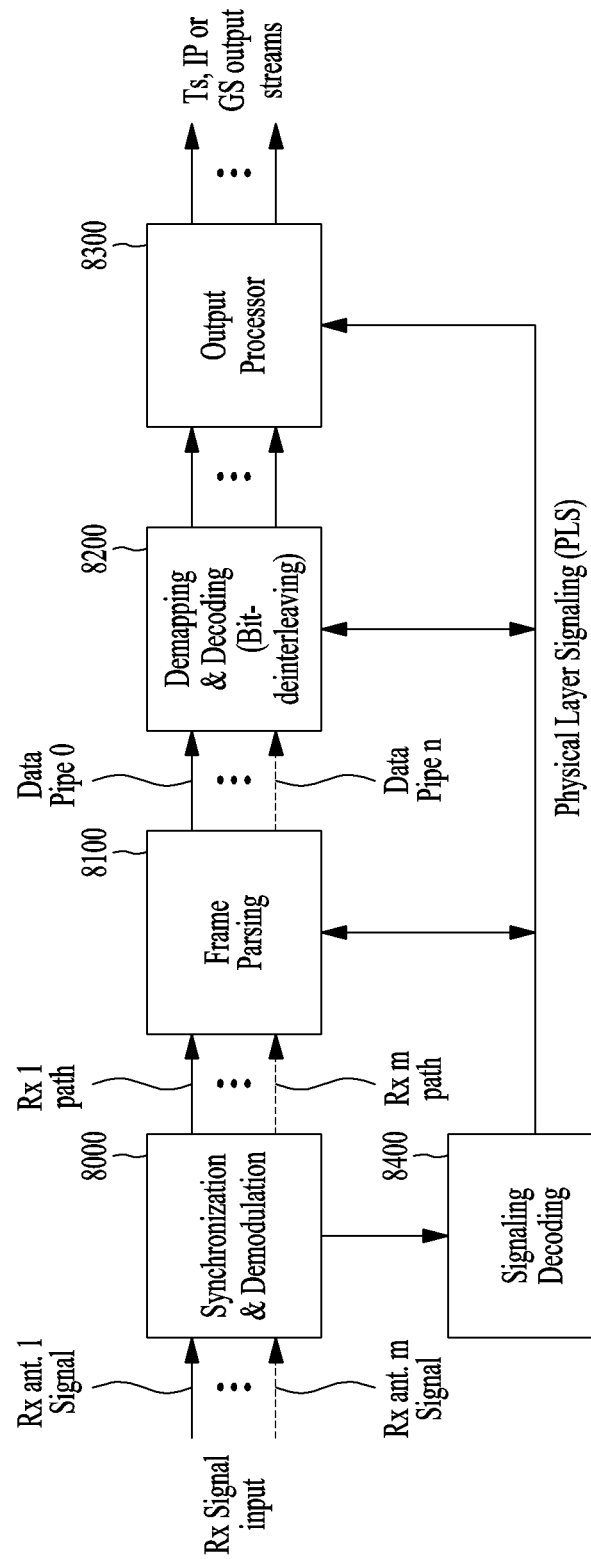
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
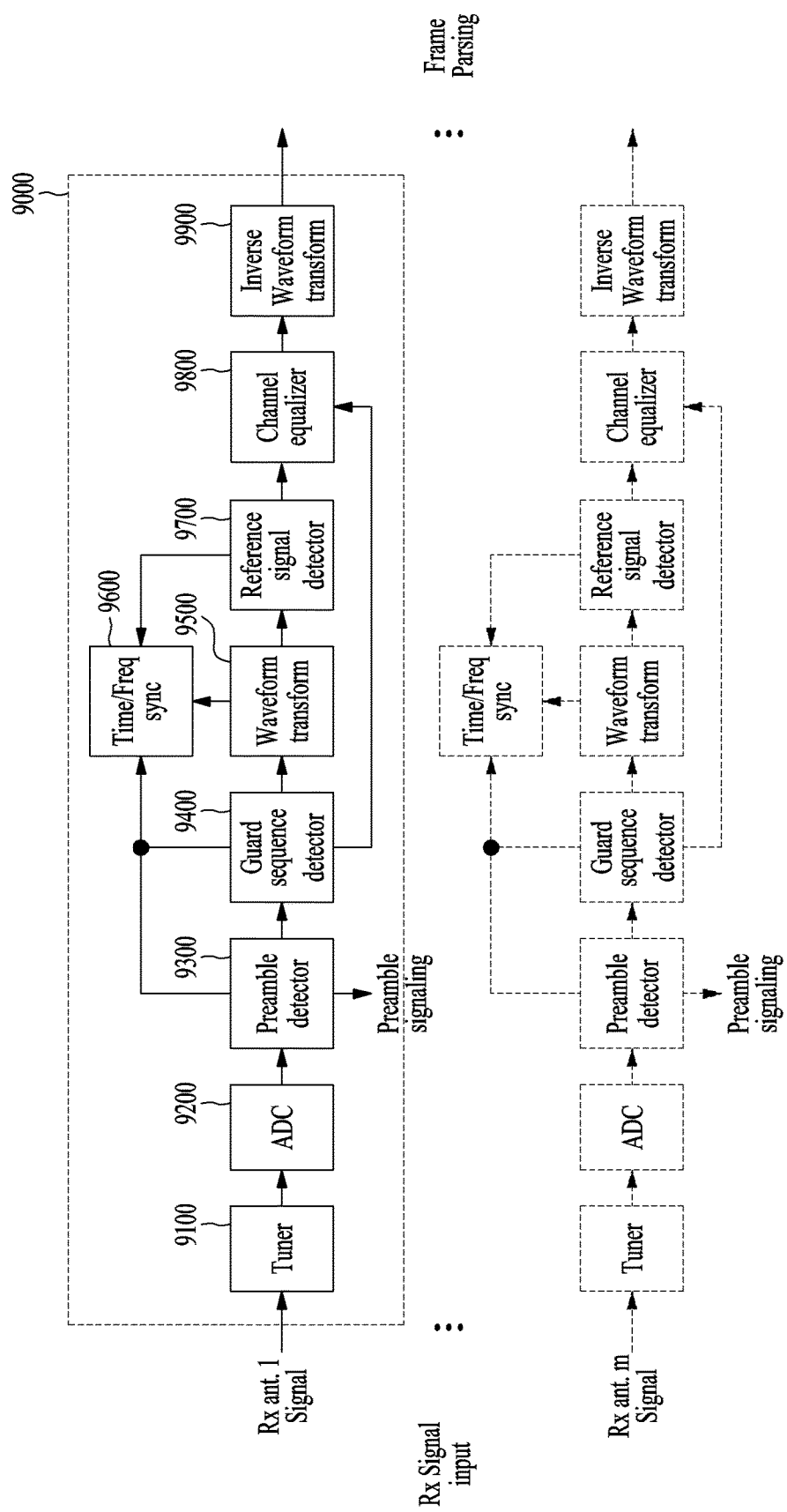
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
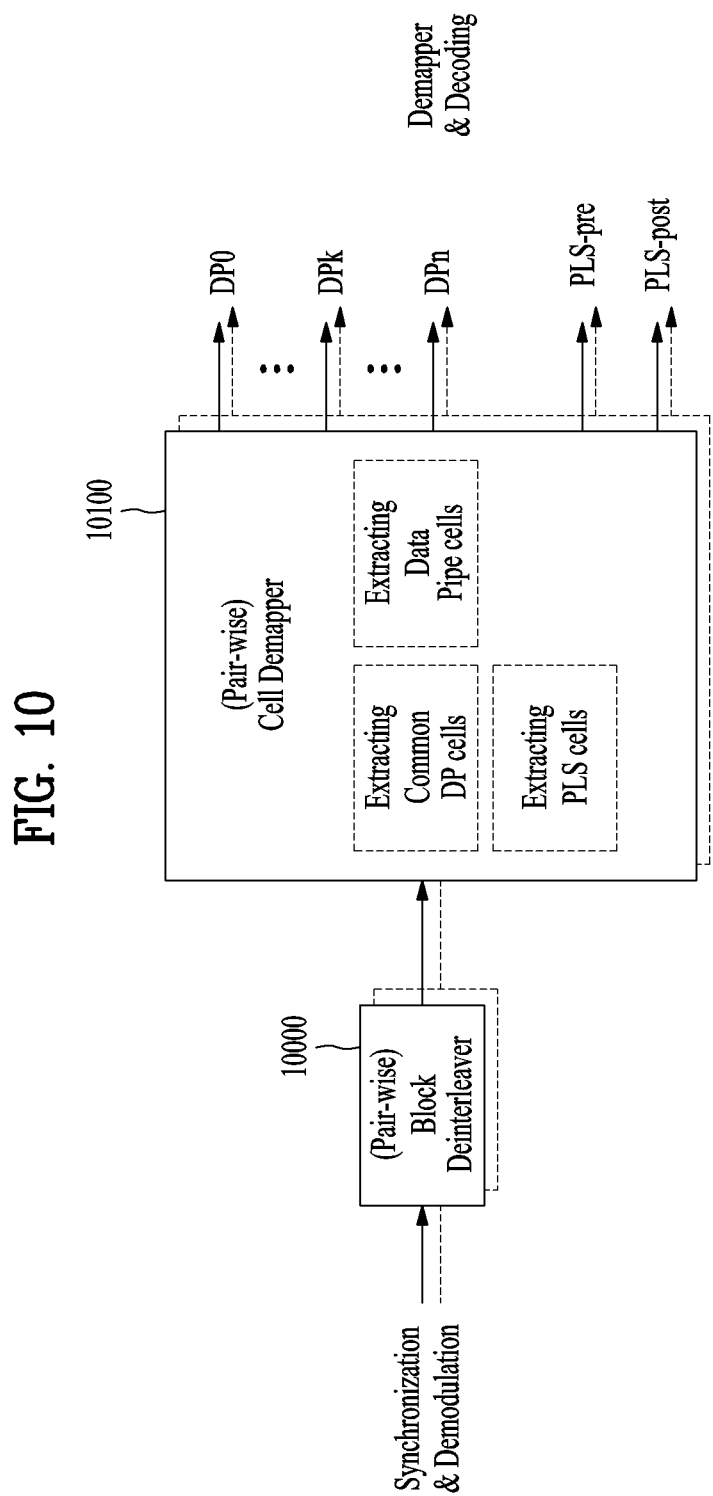
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As illustrated in FIG. 10, the frame parsing module according to an embodiment of the present invention may include at least one block deinterleaver 10000 and at least one cell demapper 10100.

The block deinterleaver 10000 may deinterleave data input through each data path of m Rx antennas and processed by a synchronization & demodulation module, on a signal block basis. In this case, as described above in relation to FIG. 8, if pair-wise interleaving has been performed by the transmitter, the block deinterleaver 10000 may process two contiguous data of each input path, as a pair. Accordingly, the block deinterleaver 10000 may output two contiguous output data even when deinterleaving is performed. In addition, the block deinterleaver 10000 may perform an inverse process of the interleaving process performed by the transmitter, to output data in original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
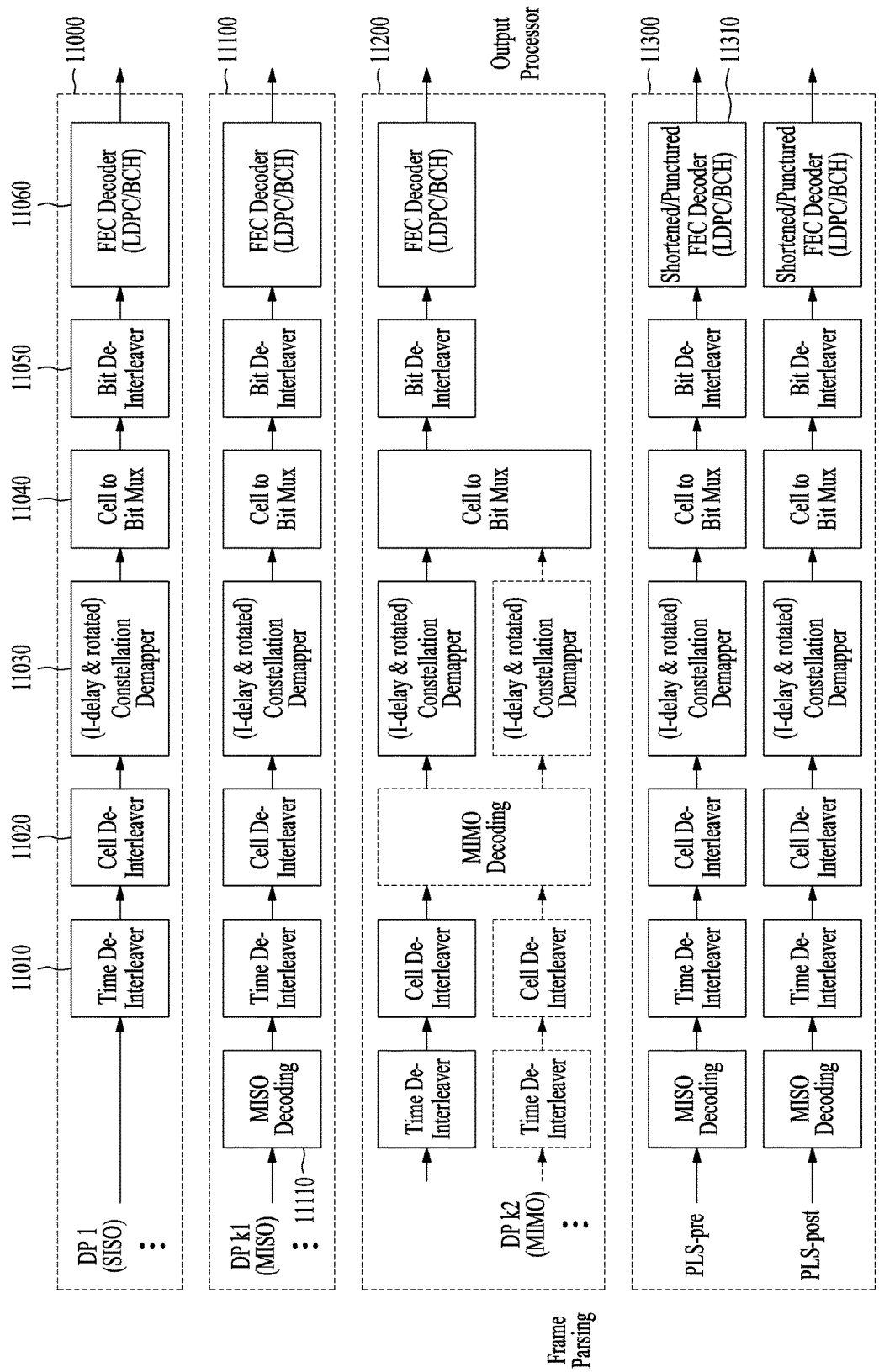
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
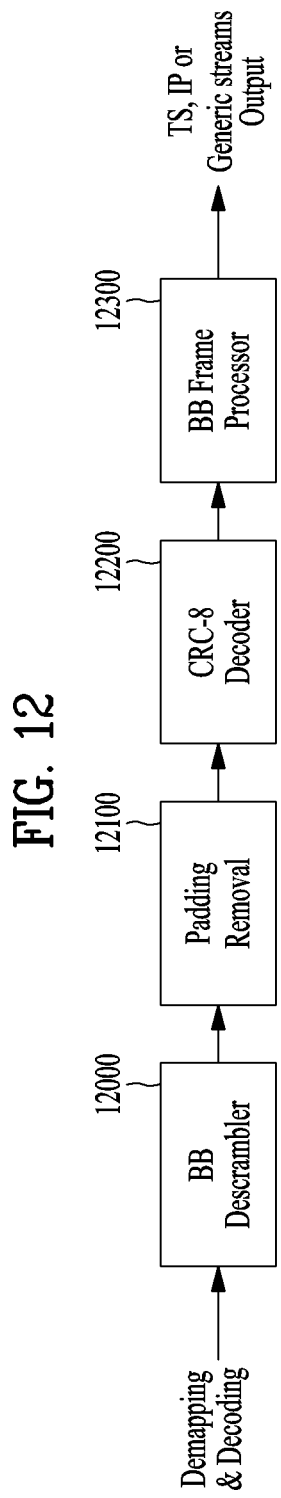
FIG. 12 illustrates an output processor according to an embodiment of the present invention.
Figure 13:
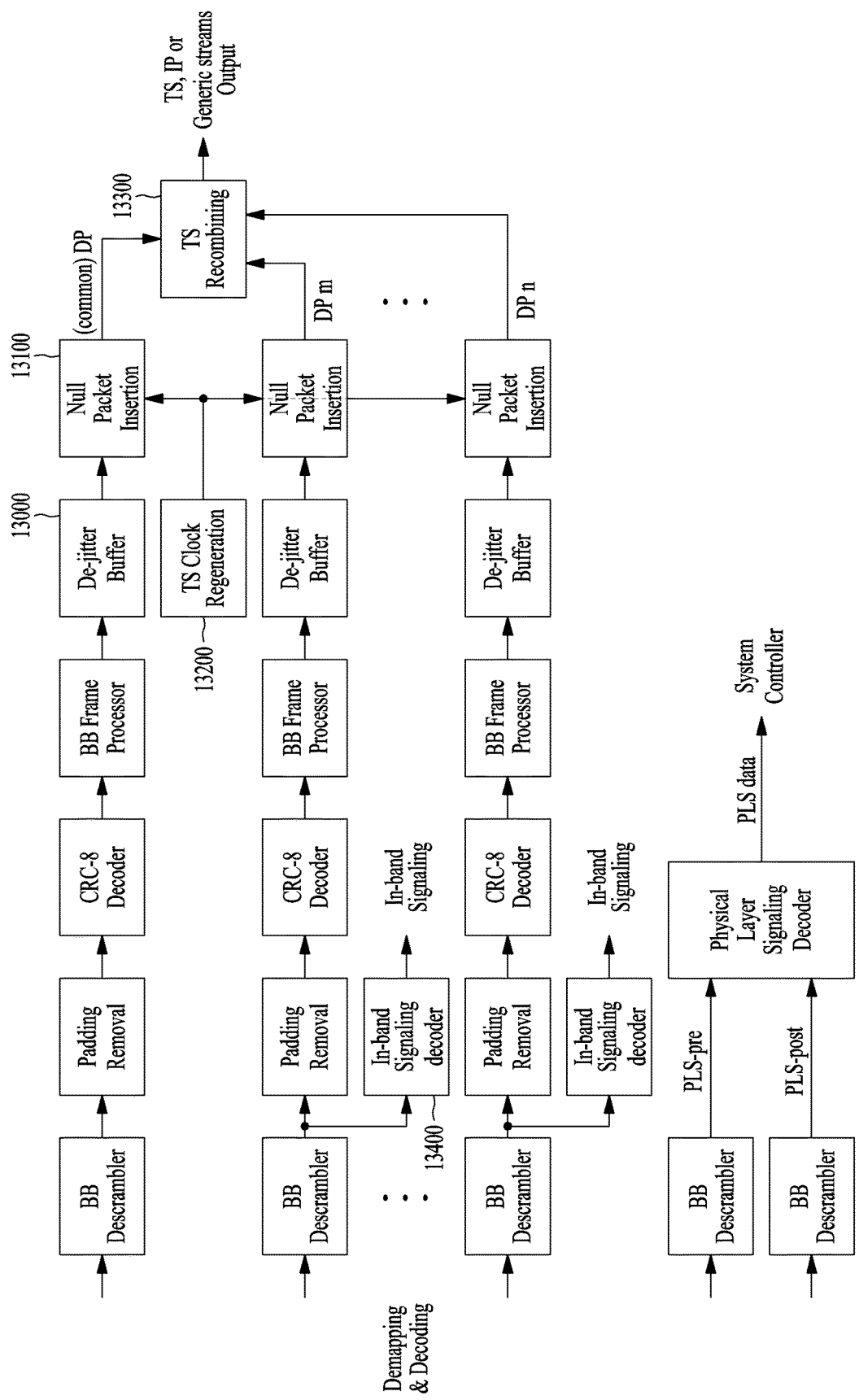
FIG. 13 illustrates an output processor according to another embodiment of the present invention.

FIGS. 12 and 13 illustrate output processors according to embodiments of the present invention.

FIG. 12 illustrates an output processor according to an embodiment of the present invention.

The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB descrambler block 12000, a padding removal block 12100, a CRC-8 decoder block 12200 and a BB frame processor block 12300.

The BB descrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention.

The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
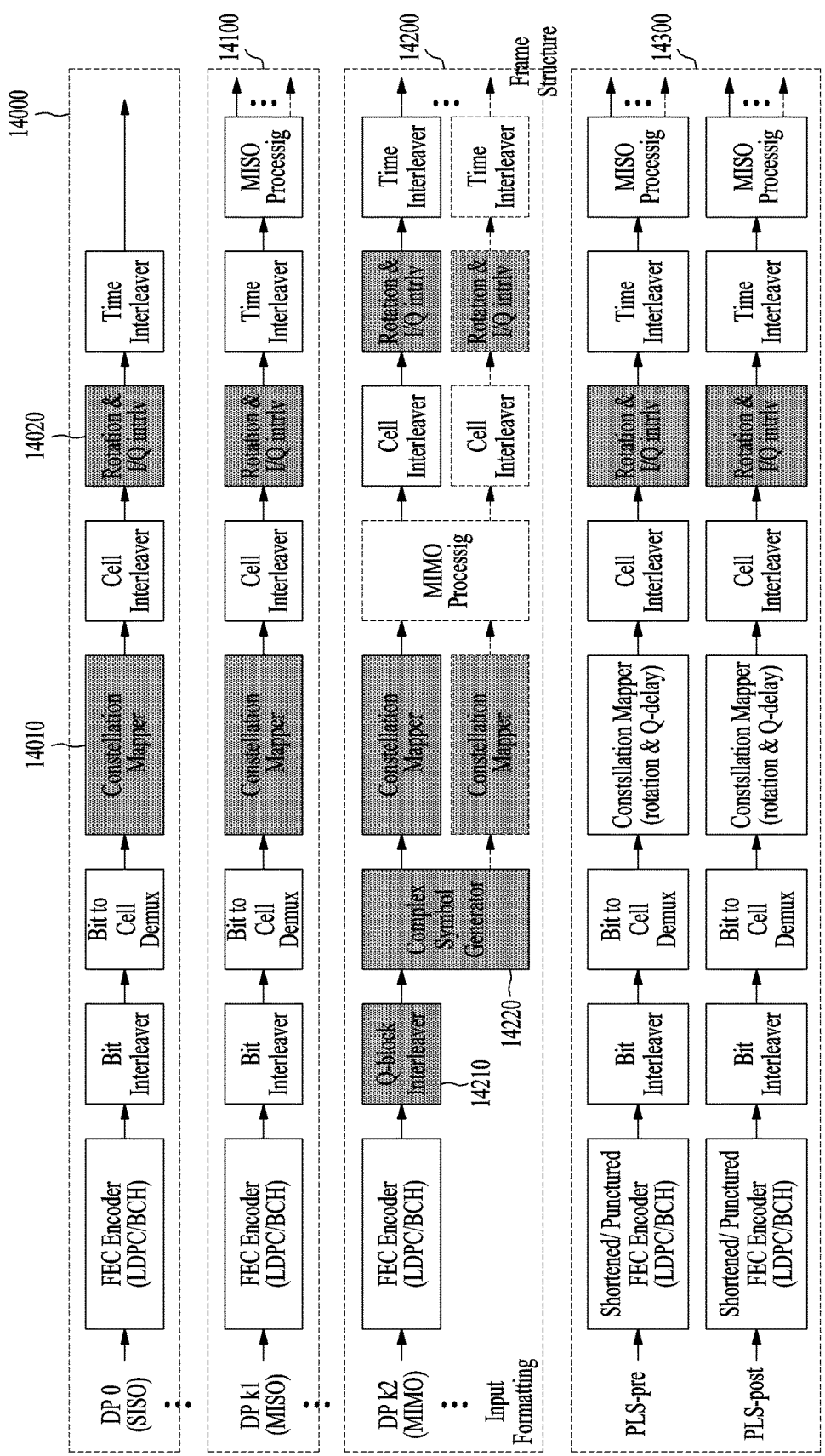
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
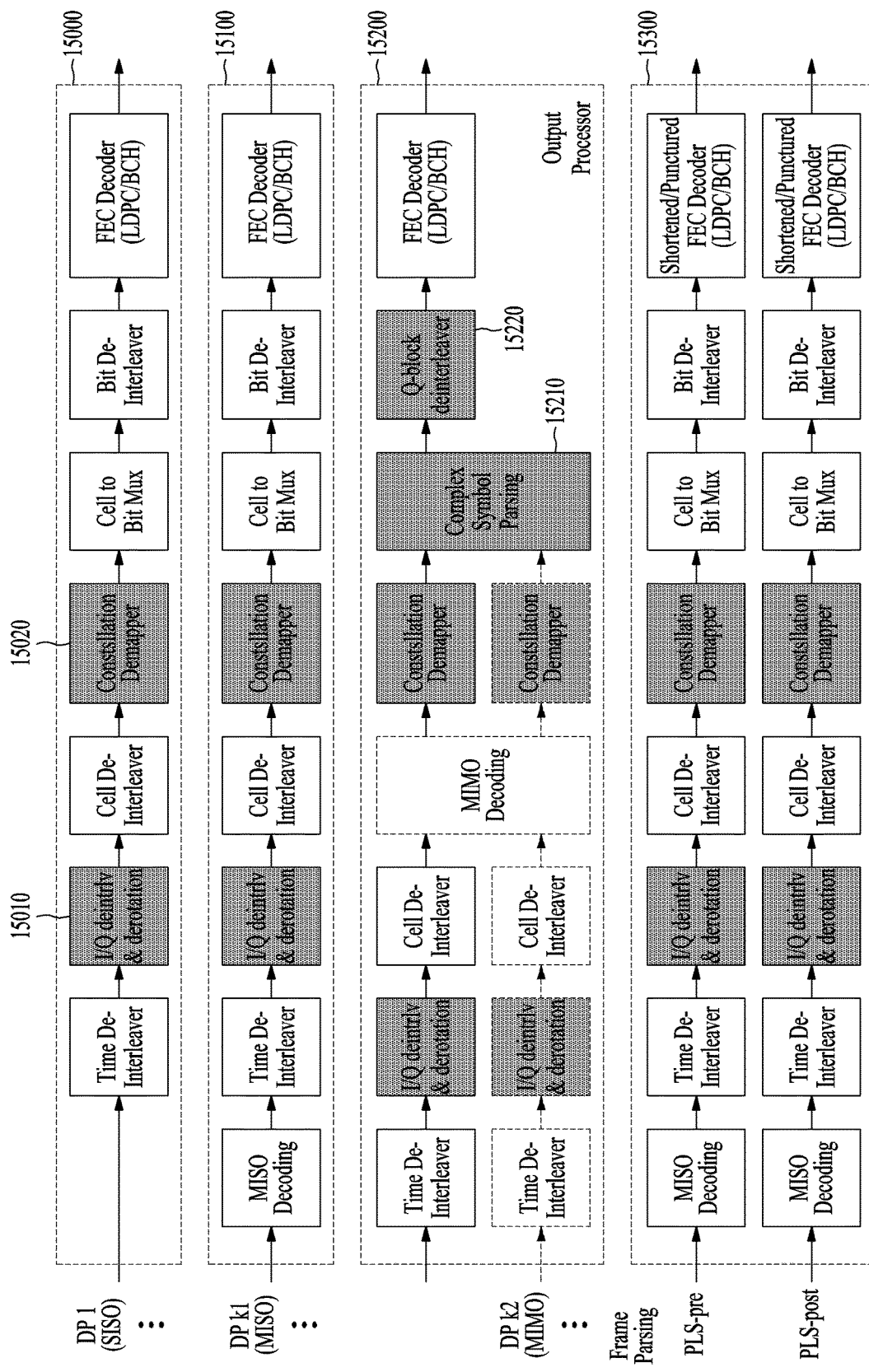
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

Figure 16:
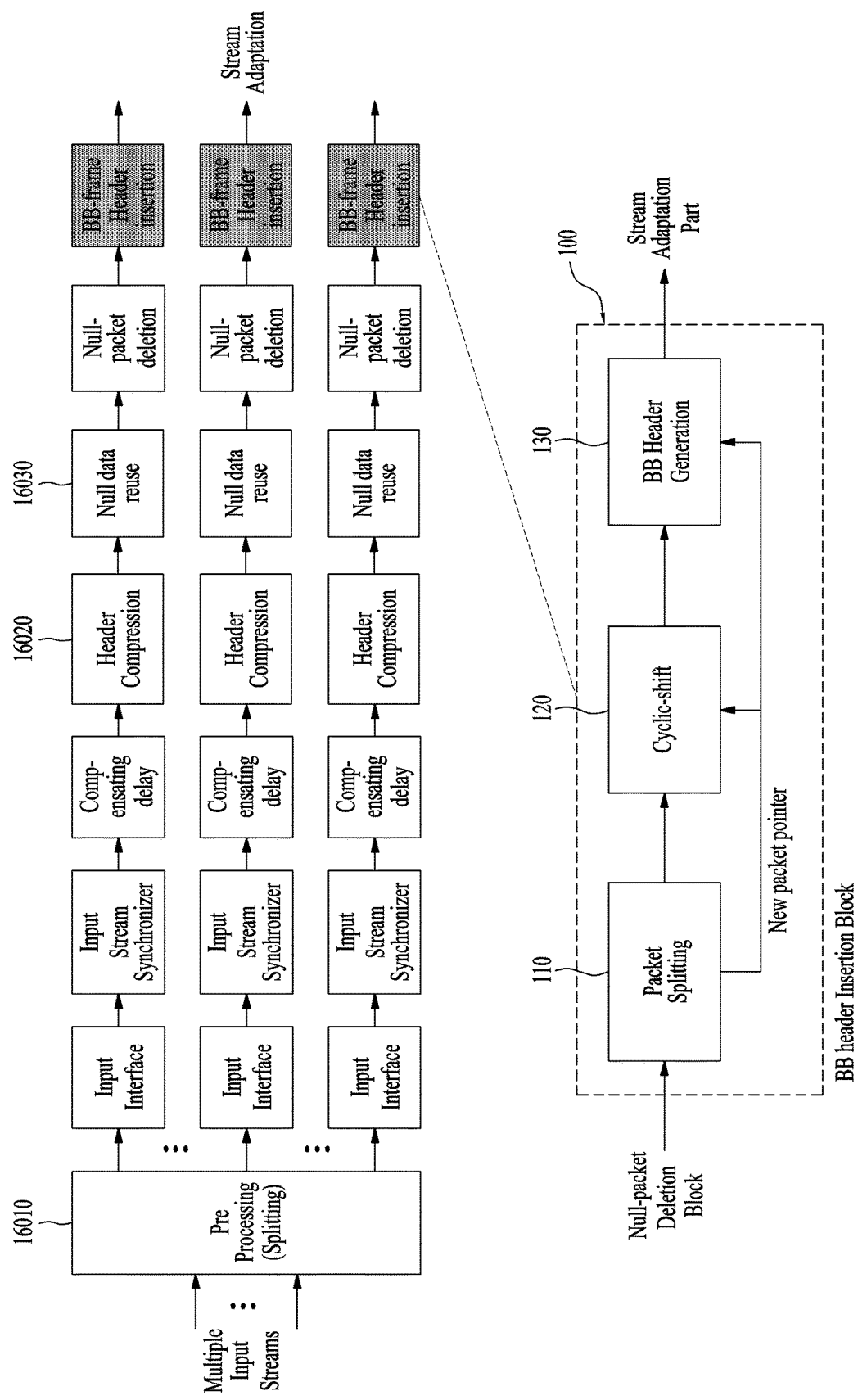
FIG. 16 illustrates an input formatting module and a new BB header insertion block according to another exemplary embodiment of the present invention.

FIG. 16 illustrates an input formatting module and a new BB header insertion block according to another exemplary embodiment of the present invention.

The present invention proposes a new BB header insertion block, which corresponds to the above-described BB header insertion block. The new BB header insertion block may correspond to a BB header insertion block according to a Cyclic-shifted Payload Method, which is proposed in the present invention.

As described above, an input formatting block of a next generation broadcasting system may process input data (TS, GSE, IP, and so on) and may output the processed data to a coding and modulation module. The input data may be configured of an input stream format, and the input stream may include a plurality of input packets (e.g., TS packets, and so on). The input formatting block may perform a process of creating frames by dividing the input stream to a predetermined length, so that the input stream can be processed by the coding and modulation module. During this process, a starting point of the input packet may not match with (or be identical to) a starting point of the created frame. Accordingly, for the decoding process, a value indicating the starting point of the input packet may be inserted in a frame header. However, if the value indicating the starting point includes an error during the transmission process, this may influence all of the data packets that follow.

Accordingly, with respect to input formatting and, most particularly, a BB header insertion block, the present invention proposes a Cyclic-shifted Payload Method. The Cyclic-shifted Payload Method may provide the system with robustness against any error that may occur during the transmission process. The Cyclic-shifted Payload Method may reduce the influence on the data packets that follow even if the value indicating the starting point of the input packet includes an error. The Cyclic-shifted Payload Method will be described in more detail later on.

Additionally, according to the Cyclic-shifted Payload Method, the payload of all frames may always begin (or start) with a header of the input packet. By using the payload, when performing decoding, the receiving end may enhance the decoding performance by using header information of the input packet as a Known signal, or by using a CRC code that is included in the header information of the input packet. This may be referred to as a Joint decoding method, and this will be described in detail later on.

Unlike the above-described input formatting module, the input formatting module according to the other exemplary embodiment of the present invention may further include a pre-processing block (16010), a header compression block (16020), and/or a null data reuse block (16030).

The pre-processing block (16010) may demultiplex the received plurality of input streams to a plurality of DPs. The pre-processing block may also be referred to as a splitting block. Since the pre-processing block performs the operation of dividing the received input streams into a plurality of DPs, the subsequent (or following) blocks may be capable of processing data per DP. Herein, the input streams may correspond to TS, GSE, IP, and so on.

The header compression block (16020) may be provided in order to enhance transmission efficiency of the input streams. The header compression block may compress the header.

The null data reuse block (16030) may perform operations of reusing NULL data.

The new BB header insertion block that is shown in the drawing may include a Packet splitting block (110), a Cyclic shift block (120), and/or a BB header generation block (130).

The Packet splitting block (110) may divide a consecutive input stream into lengths that can be processed in the subsequent steps. Herein, the consecutive input stream may correspond to a consecutive series of input streams. Additionally, when performing division, the Packet splitting block may notify the starting point of the new packet to the next block. The starting point of the new packet may also be referred to as a New packet pointer. The Packet splitting block may also be referred to as a frame slicer. Herein, the packet may also be referred to as a UP (user packet).

The Cyclic shift block (120) may perform operations of executing Cyclic-shift before inputting the divided data to the payload of the BB frame. Detailed cyclic-shifting operations will be described later on. By performing this process, the decoding efficiency in the in the receiver may be enhanced.

The BB header generation block (130) may generate a BB frame header and may insert the generated BB frame header in the payer, which is generated in previous blocks. The BB frame header may transmit parameter information, and so on, which is required for the decoding process.

Figure 17:
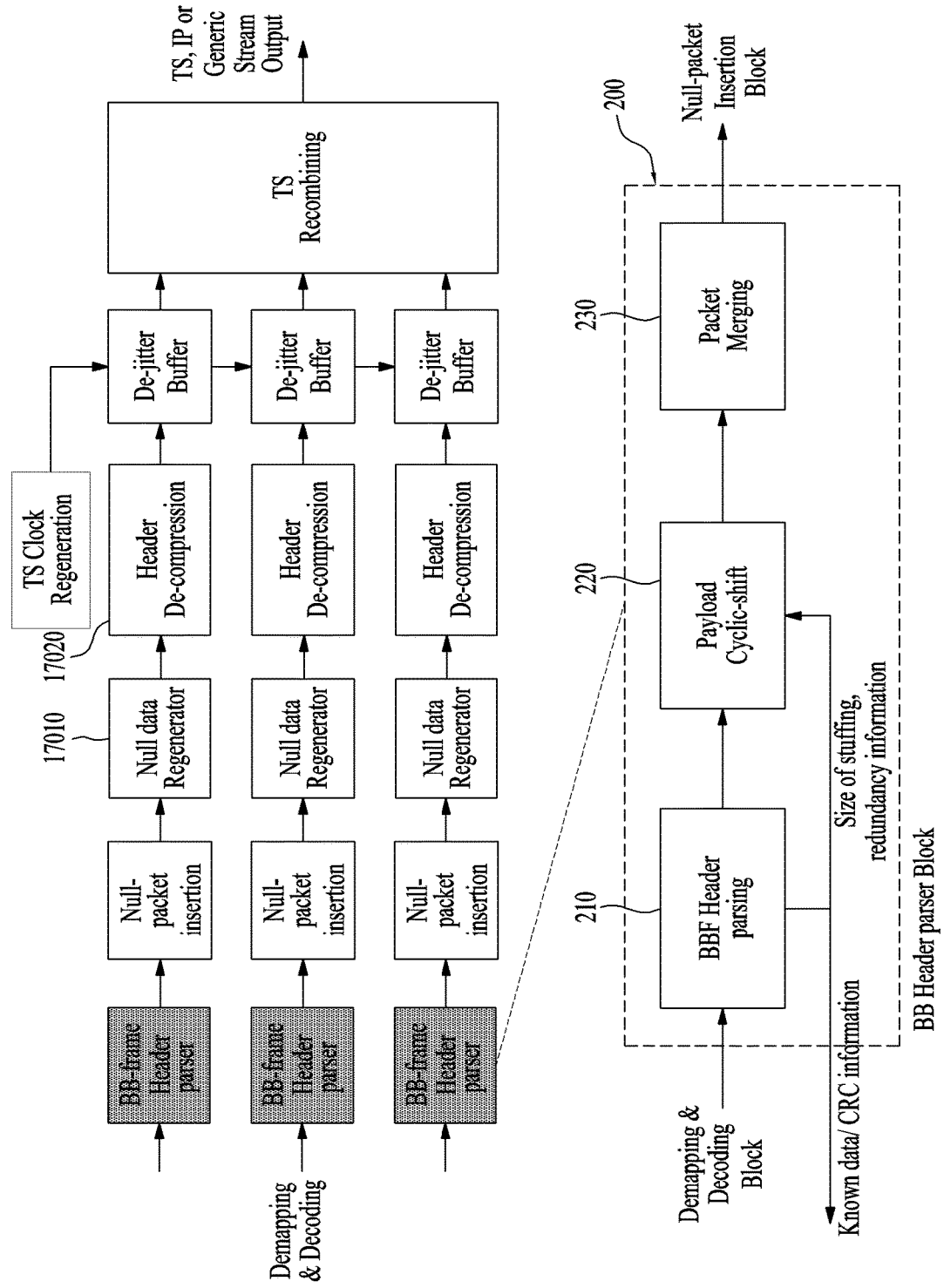
FIG. 17 illustrates an output processor and a new BB header parser block according to another exemplary embodiment of the present invention.

FIG. 17 illustrates an output processor and a new BB header parser block according to another exemplary embodiment of the present invention.

Unlike the above-described output processor, the output processor according to the other exemplary embodiment of the present invention may include a null packet regenerator block (17010) and/or a header de-compression block (17020).

The null packet regenerator block (17010) may perform operations of re-generating the NULL packet.

The header de-compression block (17020) may perform operations of de-compressing the compressed header once again.

The present invention proposes a new BB header parser block, which corresponds to the above-described BB header insertion block. The new BB header parser block may parse the header of the BB frame in the receiving end. The new BB header parser block may include a BB frame header parsing block (210), a Payload cyclic-shift block (220), and/or a packet merging block (230).

After acquiring the above-described new packet pointer from the header of the BB frame, the BB frame header parsing block (210) may deliver this to the subsequent block. Additionally, in order to perform joint decoding, the BB frame header parsing block (210) may deliver known data of the header or CRC information to a FEC block.

The Payload cyclic-shift block (220) may perform cyclic-shift on a position of the payload based upon the received new packet pointer. By doing so, the position of the payload that was shifted by the transmitting end may be inversely shifted once again, thereby being recovered to its initial position.

The packet merging block (230) may perform operations of merging divided payloads of the BB frame back to a consecutive stream.

Figure 18:
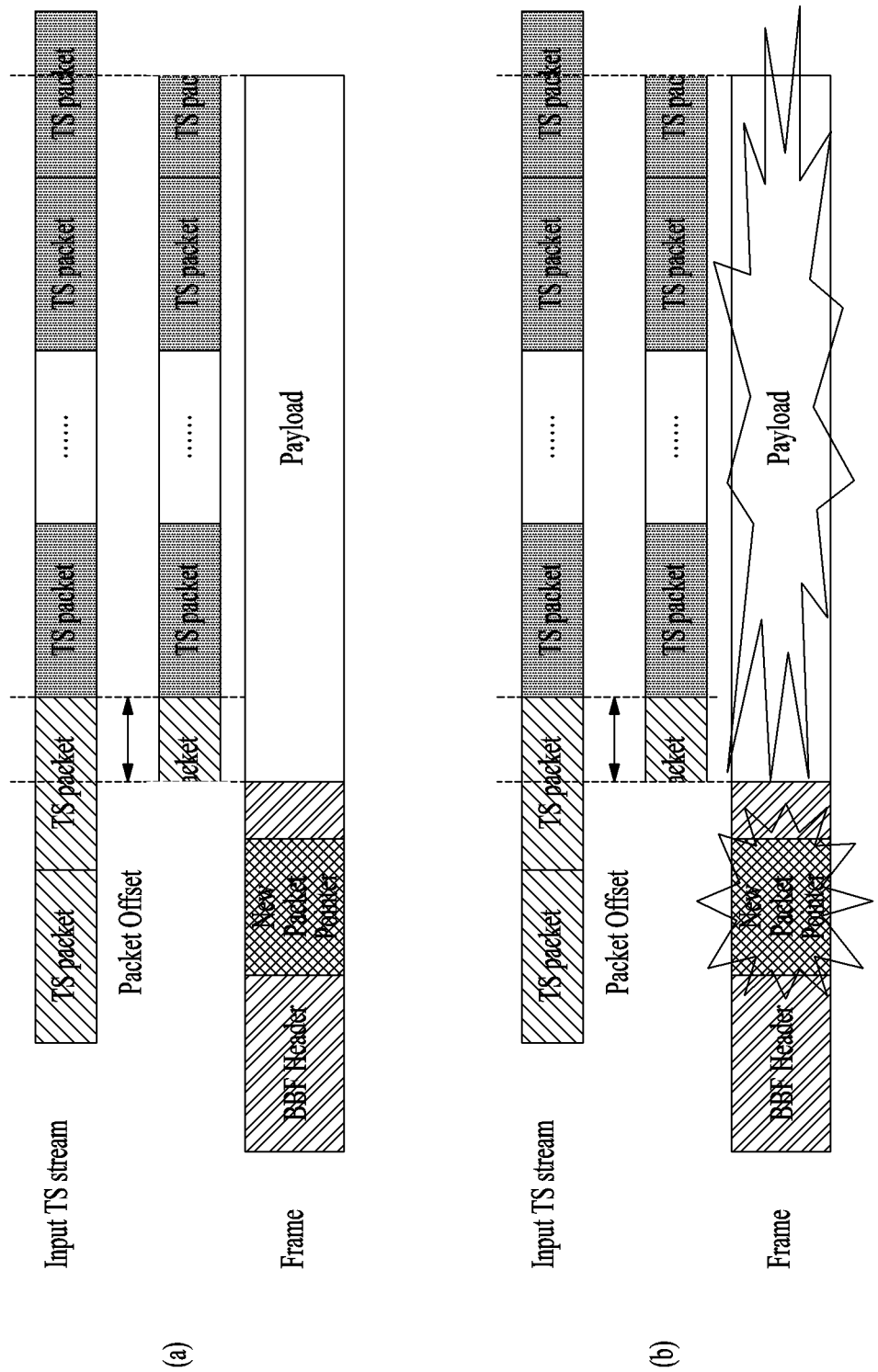
FIG. 18 illustrates problems shown in the related art input formatting procedure.

FIG. 18 illustrates problems shown in the related art input formatting procedure.

(a) of this drawing illustrates a related art input formatting (processing) procedure of a broadcasting system. The related art input processor may divide a consecutive TS stream to a size that can be processed by a BICM module.

During the division process, since the length of the payload of the frame may not be an integer multiple of the length of the packet, when inputting data to the payload, the starting point of the input packet may not accurately match with the starting point of the payload of the stream.

Accordingly, the input processor may store information on the starting point from which the new packet starts (or begins) in the header of the frame. As described above, the information on the starting point of the new packet may also be referred to as a new packet pointer, and it is also illustrated as a new packet point in this drawing. According to the conventional technology, the new packet pointer may also be referred to as SYNCD, Pointer_field, and so on.

(b) of this drawing illustrates problems that may occur, when the related art input formatting procedure is processed. In case the value of the new packet pointer indicating the starting point of the new packet is distorted during the transmission, the receiver cannot find (or locate) the starting point of the subsequent signal. Accordingly, since the value of the subsequent payload is read differently, all packets may be influenced by the distortion.

According to the related art technology, there are cases when transmission is performed after deleting a Sync byte (0x47) of the TS stream in order to increase efficiency. However, in such cases, the above-described problems that are related to the distortion may cause even greater influence.

Figure 19:
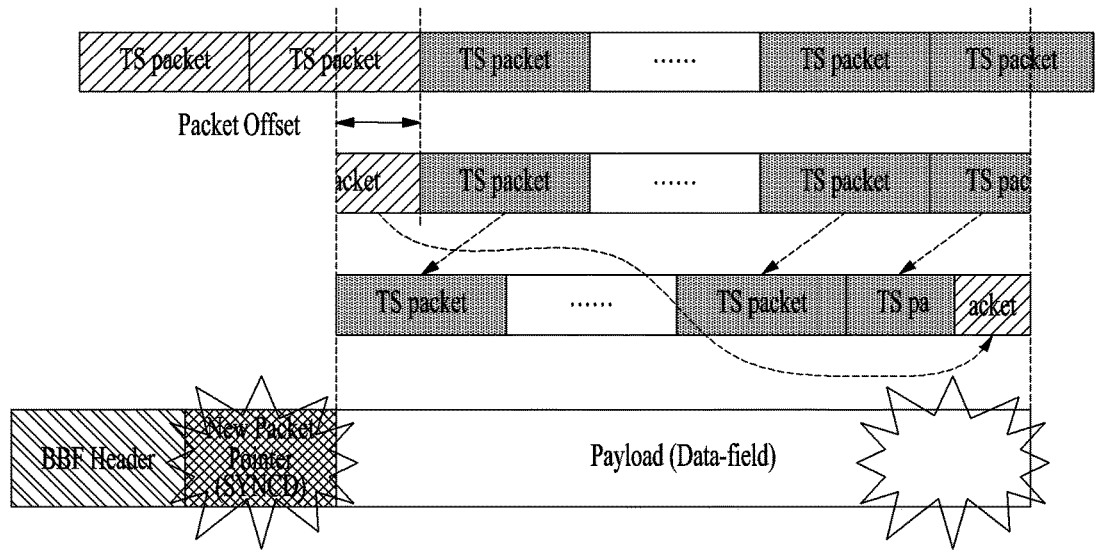
FIG. 19 illustrates a cyclic-shifted payload method according to an exemplary embodiment of the present invention.

FIG. 19 illustrates a cyclic-shifted payload method according to an exemplary embodiment of the present invention.

The present invention proposes a cyclic-shifted payload method in order to resolve the problems related to the above-described input processing.

First of all, as in the conventional method, the cyclic-shifted payload method may also perform splitting on the input stream as much as a payload size. And, an offset length of the starting point of the new packet may be stored in the new packet pointer.

Subsequently, a shifting procedure allowing the new packet to be located at the beginning of the payload may be processed. More specifically, instead of immediately transmitting a stream that has been split to the payload length through the payload, the shifting procedure allowing the new packet to be located at the beginning of the payload may be processed beforehand. Thereafter, an end part of the previous packet, which was divided and cut out, may be shifted to the end portion of the payload (Cyclic-shift).

In case of following the cyclic-shifted payload method, even if the new packet pointer of the frame header is distorted during the transmission, since the starting point of the payload matches with the starting point of the packet, malfunction during the decoding process may be reduced.

In case of following the conventional technology, when transmitting the TS stream by using 64K LDPC, 32 TS packets may be transmitted to the payload of one BB frame. However, in case the new packet pointer (SYNCD) of the frame header is distorted during the transmission, the starting points of all packets included in the payload cannot be found (or located). Additionally, in case the Synce byte (0x47) of the TS stream is deleted for the transmission efficiency, it will be even more difficult to use all of the TS packets. Numerically speaking, among the 32 TS Packets, since none of the 32 TS Packets can be used, when an error occurs in the new packet pointer, the loss rate becomes equal to 100%.

However, in case of using the cyclic-shifted payload method according to the present invention, among the 32 TS Packets, 30 TS packets may be available for decoding. Since the 30 TS packets always exist in the same location regardless of the value of the new packet pointer, even if a distortion occurs in the new packet pointer, only the last two packets may be lost. Numerically speaking, among the 32 TS Packets, since only two cannot be used, when an error occurs in the new packet pointer, the loss rate becomes equal to 5.5%. Accordingly, the loss rate may be reduced by 99.44% as compared to the related art.

Although the description provided above describes the TS packet according to one exemplary embodiment, the present invention may be applied not only to TS streams but also to other input streams, such as IP, GSE, and so on.

Figure 20:
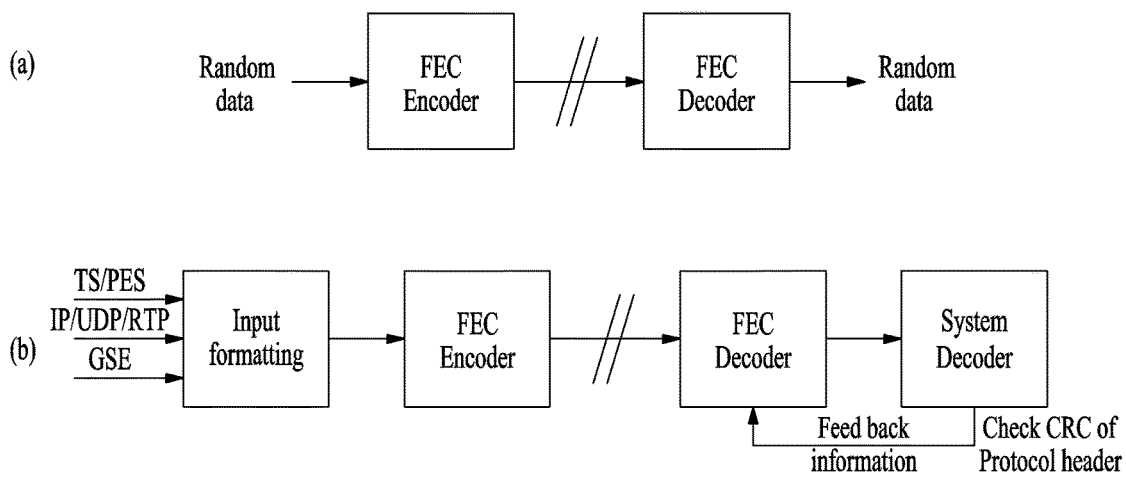
FIG. 20 illustrates a Joint decoding method according to an exemplary embodiment of the present invention.

FIG. 20 illustrates a Joint decoding method according to an exemplary embodiment of the present invention.

(a) of this drawing may correspond to a diagram showing FEC encoding and decoding according to the related art technology. The related art FED encoding/decoding technology may correspond to configuring a system by using inputted signals as random data. Accordingly, even when performing decoding, each processing may be performed independently.

However, apart from the random data that are to be transmitted, the signals that are actually being inputted/outputted may be included in known data, such as header information, or in an error detection technology, such as CRC. Herein, the known data may correspond to TS header, PES header, BB frame header, section data, Null data, and so on.

(b) of this drawing may correspond to a diagram showing a joint decoding method, which is proposed in the present invention. When decoding is performed on the FEC block, instead of having the decoding process performed independently, the decoding process may be performed by using known data that are included in the packet header or by using CRC data. As described above, if the FEC decoder and the system decoder perform joint decoding, the decoding performance may be enhanced (joint decoding).

Most particularly, in case of applying the cyclic-shifted payload method, which is proposed in the present invention, the packet header may always be located at the same position. Therefore, since the location of the packet header can be known even without the SYNCD value, the joint decoding method may be performed more easily.

Figure 21:
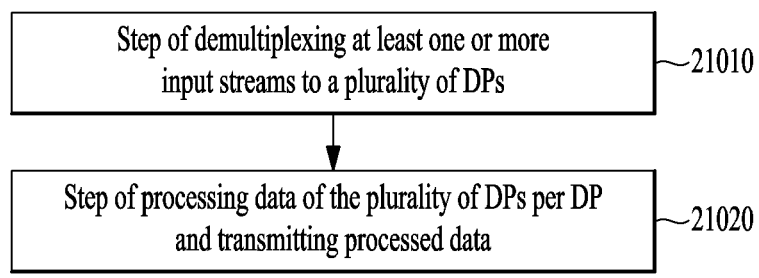
FIG. 21 illustrates a method for transmitting a broadcast signal according to an exemplary embodiment of the present invention.

FIG. 21 illustrates a method for transmitting a broadcast signal according to an exemplary embodiment of the present invention.

The method for transmitting a broadcast signal according to the exemplary embodiment of the present invention may include a step of demultiplexing at least one or more input streams to a plurality of DPs (Data Pipes) (21010), and/or a step of processing data of the plurality of DPs per DP and transmitting the processed data (21020).

The step of demultiplexing at least one or more input streams to a plurality of DPs (Data Pipes) (21010) may signify an operation of an input formatting module, which includes the above-described new BB header insertion block. More specifically, according to the exemplary embodiment of the input formatting module, which includes the above-described new BB header insertion block, the input formatting module may correspond to the step of demultiplexing the input stream. Herein, the input stream may correspond to TS, GSE, IP, and so on. The step of demultiplexing at least one or more input streams to a plurality of DPs (Data Pipes) (21010) may include a step of dividing the input stream into a plurality of DPs, a step of segmenting data of the plurality of DPs into data units each having the same length as that of the payload of a BB frame, a step of cyclic-shifting the input packets of the segmented data, a step of allocating the cyclic-shifted input packets to the payload of the BB frame, and/or a step of inserting a header before the payload of the BB frame.

The step of dividing the input stream into a plurality of DPs may signify the above-described pre-formatting block splitting the input stream into a plurality of DPs. Herein, the data of the plurality of DPs correspond to segments of the input stream, and at least one or more input packets may be connected to one consecutive stream.

The step of segmenting data of the plurality of DPs into data units each having the same length as that of the payload of a BB frame may correspond to a step of having the data of the DP segmented by the above-described packet splitting block. As described above, the data of the DP, i.e., consecutive packets may be segmented to have the same length as that of the payload of the BB frame. As described above, such operation may be processed in order to allow the subsequent blocks to perform their respective operations.

The step of cyclic-shifting the input packets of the segmented data may correspond to a step of having the above-described cyclic-shift block perform cyclic shift before allocating the segmented data of the input packets to the payload. Herein, cyclic shift may signify cyclic-shift operations according to the above-described cyclic-shifted payload method.

The step of allocating the cyclic-shifted input packets to the payload of the BB frame may correspond to a step of having the above-described cyclic-shift block allocate the cyclic-shifted input packets to the payload.

The step of inserting a header before the payload of the BB frame may correspond to operations of the above-described BB header generation block of generating a BB frame header and inserting the generated BB frame header before (or in front of) the payload, which is generated by the previous blocks. As described above, parameter information, and so on, that is required for the decoding process may be located in the header.

The step of processing data of the plurality of DPs per DP and transmitting the processed data (21020) may correspond to operations performed by the above-described coding and modulation module, frame structure module, and waveform generation module for processing and transmitting the data of the plurality of DPs. Most particularly, the coding and modulation module may process the data of the DP per DP.

In the method for transmitting a broadcast signal according to another exemplary embodiment of the present invention, the step of cyclic-shifting the input packets of the segmented data may include a step of performing shifting so as to allocate, among the input packets of the segmented data, a first input packet being uncut to a beginning of the payload. Among the operations of the above-described cyclic-shift block, this may correspond to the operation of shifting the segmented data so that, among the data being segmented to the payload size, an uncut packet appearing firsthand can be wholly allocated to the beginning (or front part) of the payload.

In the method for transmitting a broadcast signal according to yet another exemplary embodiment of the present invention, the step of cyclic-shifting the input packets of the segmented data may further include a step of performing shifting so as to allocate, among the input packets of the shifted data, an input packet having its front portion cut out to the end of the payload. Among the operations of the above-described cyclic-shift block, this may correspond to the operation of performing shifting so that the fragment that was cut during the segmentation can be allocated to the very end of the BB frame.

In the method for transmitting a broadcast signal according to yet another exemplary embodiment of the present invention, the step of processing data of the plurality of DPs per DP and transmitting the processed data may include a step of encoding data of the plurality of DPs per DP in accordance with a code rate, a step of mapping the encoded data of the DP so as to generate at least one signal frame, and/or a step of modulating data of the signal frame being generated by using an OFDM (Orthogonal Frequency Division Multiplexing) method and transmitting a broadcast signal including data of the modulated signal frame.

The step of encoding data of the plurality of DPs per DP in accordance with a code rate may correspond to a step of having the above-described coding and modulation module perform encoding on the data of the DP per DP. The step of mapping the encoded data of the DP so as to generate at least one signal frame may correspond to a step of having the above-described frame structure module generate a signal frame as described above. The step of modulating data of the signal frame being generated by using an OFDM (Orthogonal Frequency Division Multiplexing) method and transmitting a broadcast signal including data of the modulated signal frame may correspond to a step of having the above-described waveform generation module modulate data in order to perform transmission and transmit the modulated data.

The above-described process steps may be omitted or may be replaced by other process steps having similar or identical functions as the above-described process steps.

Figure 22:
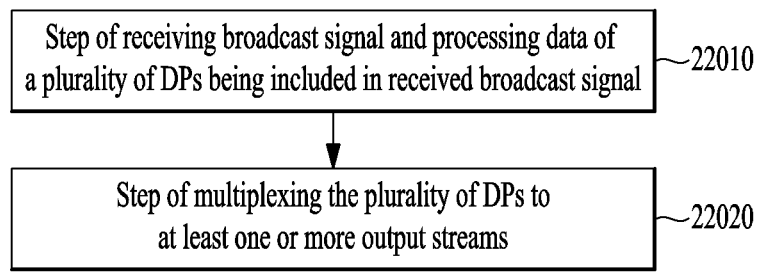
FIG. 22 illustrates a method for receiving a broadcast signal according to an exemplary embodiment of the present invention.

FIG. 22 illustrates a method for receiving a broadcast signal according to an exemplary embodiment of the present invention.

The method for receiving a broadcast signal according to an exemplary embodiment of the present invention may include a step of receiving a broadcast signal and processing data of a plurality of DPs being included in the received broadcast signal (22010), and/or a step of multiplexing the plurality of DPs to at least one or more output streams (22020).

The step of receiving a broadcast signal and processing data of a plurality of DPs being included in the received broadcast signal (22010) may signify a step of having the above-described synchronization & demodulation module receive and demodulate a broadcast signal, and having the above-described frame parsing module parse a signal frame, and having the above-described demapping & decoding module perform decoding per DP as described above.

The step of multiplexing the plurality of DPs to at least one or more output streams (22020) may signify a step of having the output processor module process the plurality of DPs into an output stream. The step of multiplexing the plurality of DPs to at least one or more output streams (22020) may include a step of gaining a new packet pointer by parsing a header of data of a DP, a step of cyclic-shifting packets of the data of the DP by using the new packet pointer, and/or a step of merging the cyclic-shifted data into a consecutive output stream.

The step of gaining a new packet pointer by parsing a header of data of a DP may correspond to a step of having the above-described the BB frame header parsing block gain the above-described new packet pointer. Herein, as described above, the new packet pointer may include information that is required for performing decoding.

The step of cyclic-shifting packets of the data of the DP by using the new packet pointer may correspond to a step of having the above-described payload cyclic-shift block perform cyclic-shifting based upon the received new packet pointer. As described above, by doing so, the position of the payload that was shifted by the transmitting end may be inversely shifted once again, thereby being recovered to its initial position.

The step of merging the cyclic-shifted data into a consecutive output stream may signify an operation performed by the above-described packet merging block for merging a divided payload back to a consecutive stream.

In the method for receiving a broadcast signal according to another exemplary embodiment of the present invention, the step of cyclic-shifting packets of the data of the DP may include a step of relocating a packet fragment located at an end portion of the data of the DP having been shifted by the transmitting end back to a beginning of the data of the DP. This step may correspond to a step of having the above-described payload cyclic-shift block perform an inverse process of the operation of the cyclic-shift payload method, which is performed by the transmitting end. This may correspond to a step of relocating the packet fragment having its front portion cut out, which was initially allocated to the end portion of the payload by the transmitting end, back to its initial position, which corresponds to the front portion (or beginning) of the payload. This operation may be performed by using the above-described new packet pointer.

In the method for receiving a broadcast signal according to yet another exemplary embodiment of the present invention, the step of cyclic-shifting packets of the data of the DP may further include a step of shifting the data of the DP having its packet fragment relocated. This may signify an operation of shifting the whole payload back to its initial position after relocating the packet fragment having its front portion cut out, which was initially allocated to the end portion of the payload, to the front portion (or beginning) of the payload.

In the method for receiving a broadcast signal according to yet another exemplary embodiment of the present invention, the step of receiving a broadcast signal and processing data of a plurality of DPs being included in the received broadcast signal may include a step of receiving a broadcast signal and demodulating data of a signal frame included in the received broadcast signal by using an OFDM method, a step of parsing a signal frame by de-mapping data of the plurality of DPs, and/or a step of decoding the data of the plurality of DPs per DP in accordance with the code rate.

The step of receiving a broadcast signal and demodulating data of a signal frame included in the received broadcast signal by using an OFDM method may correspond to a step having the above-described synchronization & demodulation module receive and demodulate a broadcast signal.

The step of parsing a signal frame by de-mapping data of the plurality of DPs may correspond to a step of having the above-described frame parsing module parse a signal frame.

The step of decoding the data of the plurality of DPs per DP in accordance with the code rate having the above-described demapping & decoding module perform decoding per DP as described above.

In the method for receiving a broadcast signal according to yet another exemplary embodiment of the present invention, the step of decoding the data of the plurality of DPs per DP in accordance with the code rate may perform decoding by using data being included in a packet header of packets of the data of the DP. In this step, by using the above-described joint decoding method, when performing decoding, decoding on the FEC block may be performed by using known data that are included in the packet header or by using CRC data. Most particularly, in case of applying the cyclic-shifted payload method, which is proposed in the present invention, the packet header may always be located at the same position. Therefore, since the location of the packet header can be known even without the SYNCD value, the joint decoding method may be performed more easily.

The above-described steps may be omitted or replaced by other steps having the same or similar functions.

While the present invention has been described with reference to separate drawings for convenience, a new embodiment may be implemented by combining embodiments described in the drawings. When needed, designing a computer-readable recording medium having recorded thereon a program for executing the afore-described embodiments of the present invention may fall within the scope of the present invention.

The apparatus and method according to the present invention are not limited to the above-described embodiments. The whole or part of each embodiment may be selectively combined with that of another embodiment so as to make various modifications to the embodiments.

The broadcast signal transmission/reception method according to the present invention can also be embodied as processor-readable code on a processor-readable recording medium. The processor-readable recording medium is any data storage device that can store data which can be thereafter read by a processor. Examples of the processor-readable recording medium include read-only memory (ROM), random-access memory (RAM), magnetic tapes, floppy disks, optical data storage devices and carrier waves (e.g., transmission through the Internet). The processor-readable recording medium can also be distributed over network coupled computer systems so that the processor-readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In addition, the disclosure describes both a product invention as well as a method invention, and descriptions of both inventions may be complementarily applied as needed.

MODE FOR CARRYING OUT THE PRESENT INVENTION

Various embodiments have been described in the best mode for carrying out the invention.

INDUSTRIAL APPLICABILITY

The present invention has industrial applicability in broadcasting and telecommunication fields.

What is claimed is:

1. A method for transmitting a broadcast signal, the method comprising:

input formatting one or more input streams into a plurality of PLPs (Physical Layer Pipes), at least one of the input streams including one or more consecutive input packets, wherein the input formatting includes encapsulating the input streams into data packets, and the encapsulating comprises:

removing sync bytes from the input packets, grouping data from an input stream into a group, wherein a length of the group is the same as a length of a payload, allocating the group into the payload of a data packet in a way that a start of the payload is aligned with a start of an input packet in the group, and generating a header in front of the payload of the data packet;

encoding data of the plurality of PLPs;

building at least one signal frame by mapping the encoded data of the PLPs; and modulating data in the built at least one signal frame by an OFDM (Orthogonal Frequency Division Multiplexing) method and transmitting the broadcast signal having the modulated data.

2. The method of claim 1, wherein the allocating further comprises:

shifting the group so as to allocate the aligned input packet at the start of the payload, the aligned input packet being first input packet among input packets in the group, which is uncut during the grouping.

3. The method of claim 2, wherein the allocating further comprises:

shifting a back portion of an input packet from in front of the group, so as to allocate the back portion to the end of the payload, a front portion of the input packet being cut out during the grouping.

4. The method of claim 1, wherein the header includes signaling information for restoring the input stream at a receiver.

5. A method for receiving a broadcast signal, the method comprising:

receiving a broadcast signal and demodulating data of a signal frame included in the received broadcast signal by using an OFDM (Orthogonal Frequency Division Multiplexing) method;

parsing the signal frame by de-mapping data of a plurality of PLPs (Physical Layer Pipes);

decoding the data of the PLPs; and output processing the PLPs to one or more output streams, at least one of the output streams including one or more consecutive output packets, wherein the output processing includes decapsulating data packets in the PLPs to the output streams, and the decapsulating comprises:

parsing a header from a data packet of a PLP, wherein the data packet of the PLP includes a portion of data from an output stream, obtaining the portion of data from a payload of the data packet by using information of the header, wherein a length of the portion is the same as a length of the payload, merging the portion of data into the output stream, and restoring sync bytes of the output packets of the output streams.

6. The method of claim 5, wherein the obtaining further comprises:

relocating a packet fragment located at the end of the portion of data to in front of the portion of data, the packet fragment having been shifted to the end of the portion of data.

7. The method of claim 5, wherein the header includes signaling information for restoring the output stream.

8. The method of claim 5, wherein the decoding the data of the PLPs is conducted by using information of the header of the data packet of the PLP.

9. An apparatus for transmitting a broadcast signal, the apparatus comprising:

a processor configured to input-format one or more input streams into a plurality of PLPs (Physical Layer Pipes) by encapsulating the input streams into data packets, at least one of the input streams including one or more consecutive input packets, wherein the processor performs the input-formatting by:

removing sync bytes from the input packets, grouping data from an input stream into a group, allocating the group into a payload of a data packet in a way that a start of the payload is aligned with a start of an input packet in the group, and generating a header in front of the payload of the data packet, wherein a length of the group is the same as a length of the payload, wherein the processor is further configured to encode data of the plurality of PLPs, wherein the processor is further configured to build at least one signal frame by mapping the encoded data of the PLPs, and wherein the processor is further configured to modulate data in the built signal frame by an OFDM method; and a transmitter configured to transmit the broadcast signal having the modulated data.

10. The apparatus of claim 9, wherein the processor is further configured to shift the group so as to allocate the aligned input packet at the start of the payload, the aligned input packet being first input packet among input packets in the group, which is uncut during the grouping.

11. The apparatus of claim 10, wherein the processor is further configured to shift a back portion of an input packet from in front of the group, so as to allocate the back portion to the end of the payload, the input packet having its front portion cut out during the grouping.

12. The apparatus of claim 9, wherein the header includes signaling information for restoring the input stream at a receiver.

13. An apparatus for receiving a broadcast signal, the apparatus comprising:

a tuner configured to receive a broadcast signal; and a processor configured to demodulate data of a signal frame included in the received broadcast signal by using an OFDM (Orthogonal Frequency Division Multiplexing) method, wherein the processor is further configured to parse the signal frame by de-mapping data of a plurality of PLPs (Physical Layer Pipes), wherein the processor is further configured to decode the data of the plurality of PLP, wherein the processor is further configured to output process the plurality of PLPs to one or more output streams by decapsulating data packets in the PLPs to the output streams, at least one of the output streams including one or more consecutive output packets, wherein the processor performs the output-processing by:
parsing a header from a data packet which includes a portion of data from an output stream,
obtaining the portion of data from a payload of the data packet by using information of the header,
merging the portion of data into the output stream, and
restoring sync bytes of the output packets of the output streams, and wherein a length of the portion is the same as a length of the payload.

14. The apparatus of claim 13, wherein the processor is further configured to relocate a packet fragment located at the end of the portion of data to in front of the portion of data, the packet fragment having been shifted to the end of the portion of data.

15. The apparatus of claim 13, wherein the header includes signaling information for restoring the output stream.

16. The apparatus of claim 13, wherein the decoding the data of the plurality of PLPs is conducted by using information of the header of the data packet of the PLP.

* * * * *